Patented Oct. 20, 1953

2,656,250

UNITED STATES PATENT OFFICE 2,656,250

ALUMINA-BASE FILLERS FOR RUBBER COMPOSITIONS

Honoré Jean Thibon and Henri Joseph Paul Mathieu, Gardanne, France, assignors to Pechiney-Compagnie de Produits Chimiques et Electrometallurgiques, a corporation of France No Drawing. Application November 16, 1949, Serial No. 127,794. In France November 18, 1948

6 Claims. (Cl. 23—143)

This invention relates to reinforcing additions or fillers for rubber compositions, and more particularly to such additions which essentially comprise alumina monohydrate. It is also concerned with a method of preparing alumina monohydrate suitable for use as a reinforcing addition or filler for rubber, by partial dehydration of more hydrated alumina products or by hydration of amorphous alumina. Such preparation may be carried out by heating the raw alumina materials in an autoclave, above 120° C. and preferably in the range of from 160° C. to 250° C., which materials may comprise more highly hydrated alumina or, on the other hand, amorphous alumina, in the presence of an alkaline, neutral or acid solution.

The invention has for a further object to provide fillers for rubber compositions, comprising alumina monohydrate occurring in the natural state, for instance in boehmite-containing bauxite ores, which it is merely necessary to grind to the requisite degree of fineness. The average particle sizes of all the above-mentioned addition products are less than 20 microns and preferably less than 1 micron. Such alumina monohydrates are used as addition or filler products in the usual way as practised in the rubber industry. In the examples to follow hereinafter, batches of the following rubber mix were used:

| | Parts by weight |
|---|---|
| Smoked rubber sheet | 100 |
| Zinc oxide | 5 |
| Stearin | 1 |
| Sulfur | 2.5 |
| Mercapto-benzo-thiazol disulfide | 2 |
| Diphenyl-guanidin | 0.5 |
| Filler (alumina monohydrate) | 40 |

The batches were then vulcanized at 133° C. for 10 minutes.

Tests show that the resulting vulcanized rubber has a tensile yield strength in the range of from 300 kg./cm. sq. to 320 kg./cm. sq., equivalent to what is obtained when using as reinforcing additions or fillers the best grades of carbon black.

Experiments have shown that the above-mentioned conversion to monohydrate is essential and is much more important than the actual fineness or the shape of the particles, regardless of the particular manner in which the hydrate was prepared.

Example I

Alumina trihydrate, as obtained conventionally in the well-known Bayer process, by hydrolysis of a sodium aluminate solution in the presence of a seeding agent, comprising alumina trihydrate resulting from a previous operation, and containing particles in which the major dimension is in the range of from 20 to 65 microns, is heated in an autoclave at 205° C. for 1 hour in the presence of a sodium aluminate solution, in which the molar ratio of caustic $Na_2O$ to $Al_2O_3$ equals 1.8 and having a concentration of 130 grams caustic $Na_2O$ per litre.

A monohydrate is obtained, in which the particle size averages 13 microns, and is used as a filler for the above-defined rubber composition, giving the following test results:

| | |
|---|---|
| Tensile yield strength____kg./cm. sq__ | 300 |
| Elongation_____per cent__ | 550 |

Example II

A very fine grade of alumina trihydrate is used, as prepared by hydrolysis at 25° C. of a sodium aluminate solution in the presence of a seeding medium comprising alumina gel, in accordance with the process disclosed and claimed in our copending application Serial No. 127,532, filed November 15, 1949.

The said trihydrate, when examined under an electron microscope, is found to be composed of small prisms, of regular shape, frequently twinned and measuring from 0.05 to 0.5 micron over their major dimension. When used as a filler for rubber, the following results are obtained:

| | |
|---|---|
| Tensile yield strength____kg./cm. sq__ | 261 |
| Elongation_____per cent__ | 520 |

(a) Part of this trihydrate is converted into alumina monohydrate, by two hours heating at 210° C. in an autoclave in the presence of water. The resulting monohydrate, when examined under an electron microscope (magnification 50,000), is found to comprise very flat prisms, frequently stacked on top of one another and wherein the major dimensions vary in a range of from 0.3 to 0.6 micron. When used as a reinforcing filler for the said rubber mix, the test results are as follows:

| | |
|---|---|
| Tensile yield strength____kg./cm. sq__ | 288 |
| Elongation_____per cent__ | 570 |

(b) The remainder of the alumina trihydrate is converted to the monohydrate in an autoclave at 210° C. during two hours in the presence of a sodium aluminate solution, having a molar ratio of caustic $Na_2O$ to $Al_2O_3$ equalling 1.8 and having a concentration of e. g. 80 grams caustic $Na_2O$ per litre.

The resulting monohydrate, as viewed in an electron microscope, shows a definitely lamellar or flaky structure, each lamella having a depth or thickness dimension greater than 1 millimicron but always less than 20 millimicrons. The major dimension of each lamella or flake is in the order of 1 or 2 microns. When used as a filler for the above-defined rubber mix this monohydrate product yields the following physical test results:

Tensile yield strength_____kg./cm. sq__ 364
Elongation_____per cent__ 620

*Example III*

Very fine alumina trihydrate, prepared as indicated in the first paragraph of Example II, is converted into the monohydrate by autoclave-heating at 210° C. for 2 hours in the presence of various aqueous solutions of sodium carbonate, respectively containing:

5 g. $CO_3Na_2$ per litre
25 g. $CO_3Na_2$ per litre
50 g. $CO_3Na_2$ per litre
100 g. $CO_3Na_2$ per litre
200 g. $CO_3Na_2$ per litre The respective resulting alumina monohydrates are used as fillers in rubber with the following results:

| Concentration of the liquid phase, in grams $CO_3Na_2$ per litre | 5 | 25 | 50 | 100 | 200 |
|---|---|---|---|---|---|
| Tensile yield strength, in kg./cm. sq | 317 | 334 | 331 | 333 | 324 |
| Elongation, percent | 668 | 650 | 630 | 645 | 640 |

*Example IV*

Amorphous alumina is used as obtained by continuously mixing at ordinary temperature an aluminum sulfate solution and a sodium carbonate solution while maintaining the pH value constantly equal to 7.

The amorphous alumina is converted into monohydrate by heating at 210° C. in an autoclave during 2 hours in the presence of a sodium aluminate solution, having a caustic molar ratio $$\frac{\text{caustic } Na_2O}{Al_2O_3}=1.8$$

and containing 100 grams caustic $Na_2O$ per litre.

The resulting monohydrate, when used as a reinforcing filler for the said rubber composition, yielded the following results:

Tensile yield strength _____kg./cm. sq__ 321
Elongation _____percent__ 580

*Example V*

An alumina trihydrate is used, which was prepared by hydrolysis at 25° C. of a sodium aluminate solution effected in a ball mill in the presence of normal Bayer trihydrate as a seeding agent (see Example I).

The trihydrate is heated at 210° C. for one hour in an autoclave in the presence of water. The resulting monohydrate, used as a filler for the above-defined rubber composition, yields the following test results:

Tensile yield strength _____kg./cm. sq__ 321
Elongation _____percent__ 595

*Example VI*

A very fine alumina trihydrate, containing particles averaging 100 to 200 milimicrons in dimension, as measured through an electron microscope, is suspended in water (5 litres water per kilogram trihydrate) and then acidified to pH 4 with each one of a number of acids and salts as listed in the following table. The mixture is then heated in an autoclave for 2 hours at 210° C. The resulting alumina monohydrate is then used as a filler for rubber. The following results are obtained:

| Acids and salts used | Test results of the rubber mix | |
|---|---|---|
| | Tensile yield strength, kg./cm. sq. | Elongation, percent |
| Sulfuric acid | 325 | 580 |
| Hydrochloric acid | 356 | 600 |
| Acetic acid | 315 | 540 |
| Aluminum sulfate $(SO_4)_3Al_2$ | 321 | 590 |

Instead of the above acids and acidic salts, a buffer solution, having an accurately-adjusted acid pH value, may also be used.

*Example VII*

A French bauxite ore containing alumina monohydrate (53% $Al_2O_3$) is brought to a sufficiently high degree of fineness, for example by grinding it in the presence of water in a ball mill, then sized in a very slightly hydrochloric medium (aqueous solution containing 2 per mil HCl); on collecting the product remaining in suspension at the end of a period of 10 to 15 hours during which the suspension was allowed to stand, there is obtained, by filtering and drying at 110° C., a product which, when used as a reinforcing filler in the previously-defined rubber composition, gives the following results:

Tensile yield strength _____kg./cm. sq__ 300
Elongation _____percent__ 570

When treated in a similar way, an alumina trihydrate-containing bauxite (Malayan bauxite ore), having a 50% $Al_2O_3$ content, yielded the following results, when used in a batch of the similar rubber composition:

Tensile yield strength _____kg./cm. sq__ 249
Elongation _____percent__ 550

The same trihydrate-containing bauxite, when heated for two hours in an autoclave at 200° C. in the presence of a sodium aluminate solution, is converted into a bauxite containing alumina monohydrate and is then used as a filler in rubber. Giving the following test results:

Tensile yield strength _____kg./cm. sq__ 288
Elongation _____percent__ 560

All the above data prove that the essential factor in the reinforcing effect of this kind of filler is due to the peculiar structure of the monohydrate, whether such structure be the result of any artificially applied process, or occur naturally. The actual size and shape of the particles of the substance have a much less marked influence, although it will always be found preferable to use rather fine particles. Average dimensions in the range of from 50 to 200 millimicrons are quite satisfactory, but dimensions under 20 microns will also be found to secure some results.

The alumina monohydrate products of the invention can also be used as additions in plastics, or as supports for coloring agents and dyes in lacquers, as used for instance in pigments and in printing ink compositions.

What we claim is:

1. A new composition of matter consisting essentially of artificially produced ultra fine alumina monohydrate in lamellar form, wherein the thickness of each lamella is in the range of from 1 to 20 millimicrons and the major dimension in each lamella is substantially in the range of from 1 to 2 microns, said monohydrate having been prepared by the method comprising the steps of: adding to a sodium aluminate solution alumina gel; hydrolyzing the said solution at 25° C. to form crystalline alumina trihydrate; separating the said trihydrate and adding thereto an aqueous medium; and heating the aqueous mixture at a temperature substantially above 120° C. to produce the aforesaid alumina monohydrate.

2. A method of producing an artificial ultra fine lamellar alumina monohydrate, comprising the steps of: adding to a sodium aluminate solution alumina gel; hydrolyzing the said solution at 25° C. to form crystalline alumina trihydrate; separating the said trihydrate and adding thereto an aqueous medium; and heating the aqueous mixture at a temperature substantially above 120° C. to produce the aforesaid alumina monohydrate.

3. A method according to claim 2 in which the alumina trihydrate is heated in an autoclave at a temperature in the range of 160–250° C.

4. A method according to claim 2 in which the alumina trihydrate is heated for about 2 hours in an autoclave at a temperature of about 210° C. in the presence of an alkaline solution.

5. A method according to claim 2 in which the alumina trihydrate is heated for about 2 hours in an autoclave at a temperature of about 210° C. in the presence of an alkaline sodium aluminate solution.

6. A method of producing an artificial ultra fine lamellar alumina monohydrate, wherein the thickness of each lamella is in the range of from 1 to 20 millimicrons and the major dimension in each lamella is substantially in the range of from 1 to 2 microns, comprising the steps of: adding to a sodium aluminate solution alumina gel; hydrolyzing the said solution at 25° C. to form crystalline alumina trihydrate; separating the said trihydrate and adding thereto an aqueous medium; and heating the aqueous mixture at a temperature substantially above 120° C. to produce the aforesaid alumina monohydrate.

HONORÉ JEAN THIBON.
HENRI JOSEPH PAUL MATHIEU.

References Cited in the file of this patent

UNITED STATES PATENTS

| Number | Name | Date |
| --- | --- | --- |
| 1,322,518 | Barton | Nov. 25, 1919 |
| 1,710,481 | Keller | Apr. 23, 1929 |
| 1,953,201 | Tosterud | Apr. 3, 1934 |
| 2,247,624 | Wall | July 1, 1941 |
| 2,377,547 | Fuchs | June 5, 1945 |
| 2,378,155 | Newsome | June 12, 1945 |
| 2,549,549 | Wall | July 1, 1951 |

OTHER REFERENCES

Dana's "The System of Mineralogy," 7th Edition, 1944, J. Wiley and Sons Inc., N. Y., vol. 1, pp. 645–646, 675–679. (Q. E. 372 D23 1944.)

Mellor; Comprehensive Treatise on Inorganic and Theoretical Chemistry; vol. 5; pages 274 and 275, Longmans, Green and Co.; London; 1924.

Dana's Manual of Mineralogy; William E. Ford, 14th Edition, page 211, John Wiley and Sons, Inc., New York, 1929.